United States Patent
Ahn et al.

(10) Patent No.: US 9,760,228 B2
(45) Date of Patent: Sep. 12, 2017

(54) TRANSPARENT ELECTRODE PATTERN STRUCTURE AND TOUCH SCREEN PANEL INCLUDING THE SAME

(71) Applicant: DONGWOO FINE-CHEM CO., LTD., Jeollabuk-do (KR)

(72) Inventors: Gi Hwan Ahn, Gyeonggi-do (KR); Kyoung Su Ha, Gyeonggi-do (KR); Yoo Sung Lee, Chungcheongnam-do (KR); Yong Sun Han, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 14/779,425

(22) PCT Filed: Feb. 21, 2014

(86) PCT No.: PCT/KR2014/001408
§ 371 (c)(1),
(2) Date: Sep. 23, 2015

(87) PCT Pub. No.: WO2014/157841
PCT Pub. Date: Oct. 2, 2014

(65) Prior Publication Data
US 2016/0048242 A1    Feb. 18, 2016

(30) Foreign Application Priority Data

Mar. 29, 2013    (KR) .................. 10-2013-0034792

(51) Int. Cl.
G06F 3/044    (2006.01)
G06F 3/0354   (2013.01)
(Continued)

(52) U.S. Cl.
CPC .......... G06F 3/044 (2013.01); G06F 3/03545 (2013.01); G06F 3/041 (2013.01);
(Continued)

(58) Field of Classification Search
CPC ......... G06F 3/0488; G06F 2203/04804; G06F 3/044; G06F 2203/04111; G06F 2203/04103; G06F 3/03545; G06F 3/041
See application file for complete search history.

(56) References Cited

U.S. PATENT DOCUMENTS 7,268,770 B1    9/2007  Takahata et al.
2007/0132927 A1  6/2007  Tsuchiya
(Continued)

FOREIGN PATENT DOCUMENTS

CN    1977343 A     6/2007
CN    101576793 A   11/2009
(Continued)

OTHER PUBLICATIONS

International Search Report for PCT/KR2014/001408.
(Continued)

*Primary Examiner* — Alexander Eisen
*Assistant Examiner* — Abhishek Sarma
(74) *Attorney, Agent, or Firm* — The PL Law Group, PLLC

(57) ABSTRACT

Disclosed is a transparent electrode pattern structure including: a first transparent electrode layer and a second transparent electrode layer which are stacked on a transparent substrate in a predetermined pattern, respectively; an insulation layer disposed between the first transparent electrode layer and the second transparent electrode layer; and contact holes formed in the insulation layer to electrically connect the first transparent electrode layer with the second transparent electrode layer; wherein the first transparent electrode
(Continued)

layer and the second transparent electrode layer have a thickness of 100 to 200 nm, respectively, and the insulation layer has a thickness of 1,000 to 2,000 nm, thereby considerably decreasing a difference in reflectance on separate positions, as well as a touch screen panel including the transparent electrode pattern structure.

12 Claims, 3 Drawing Sheets

(51) Int. Cl.
    *G06F 3/041*     (2006.01)
    *G06F 3/0488*     (2013.01)

(52) U.S. Cl.
    CPC .. *G06F 3/0488* (2013.01); *G06F 2203/04103* (2013.01); *G06F 2203/04111* (2013.01); *G06F 2203/04804* (2013.01)

(56) References Cited

U.S. PATENT DOCUMENTS

| | | | |
|---|---|---|---|
| 2012/0032218 A1* | 2/2012 | Choi | H01L 33/08 257/98 |
| 2014/0232951 A1* | 8/2014 | Ueda | C23C 14/08 349/12 |

FOREIGN PATENT DOCUMENTS

| | | |
|---|---|---|
| CN | 102096496 A | 6/2011 |
| CN | 202230457 U | 5/2012 |
| JP | 2005-179481 A | 7/2005 |
| JP | 2012-203701 A | 10/2012 |
| KR | 10-2001-0033970 A | 4/2001 |
| KR | 10-2007-0042506 A | 4/2007 |
| KR | 10-2010-0044726 A | 4/2010 |
| TW | 2011-20718 A1 | 6/2011 |
| TW | 2012-39907 A1 | 10/2012 |
| TW | 2012-50529 A1 | 12/2012 |
| TW | M461102 U1 | 3/2013 |
| WO | WO2012/061975 A1 | 5/2012 |
| WO | 2012-111519 A1 | 8/2012 |

OTHER PUBLICATIONS

Office action dated Nov. 11, 2016 from Taiwan Patent Office in a counterpart Taiwan Patent Application No. 103110858.
Office action dated May 17, 2017 from Chinese Patent Office in a counterpart Chinese Patent Application No. 201480017304.7.
Office action dated May 30, 2017 from Japanese Patent Office in a counterpart Japanese Patent Application No. 2016-505379.

* cited by examiner

TRANSPARENT ELECTRODE PATTERN STRUCTURE AND TOUCH SCREEN PANEL INCLUDING THE SAME

This application claims benefit under 35 U.S.C. 119(e), 120, 121, or 365(c), and is a National Stage entry from International Application No. PCT/KR2014/001408, filed Feb. 21, 2014, which claims priority to and the benefit of Korean Patent Application No. 10-2013-0034792 filed in the Korean Intellectual Property Office on Mar. 29, 2013, the entire contents of which are incorporated herein by reference.

BACKGROUND OF THE INVENTION

1. Field of the Invention

The present invention relates to a transparent electrode pattern structure and a touch screen panel including the same, and more specifically, to a transparent electrode pattern structure with low visibility to a user and a touch screen panel including the transparent electrode pattern structure.

2. Description of the Related Art

Commonly, a touch screen is a screen equipped with a special input device to receive position signals input by touching a screen with a finger of a user or a stylus pen. Such a touch screen does not use a keyboard but has a configuration of multi-layer laminates wherein, when the finger of the user or an object such as a stylus pen touches a specific character or position displayed on the screen, the touch screen identifies the position and directly receives data through a screen picture, in order to practically process information at a specific position by a software stored therein.

In order to recognize the touched position without degrading the visibility of an image displayed on the screen, it is necessary to use a transparent electrode. Generally, the transparent electrode having a predetermined pattern formed thereon is used.

As a transparent electrode used in a touch screen panel, various structures are known in the related art. For example, a glass-ITO film-ITO film (GFF), a glass-ITO film (G1F), or a glass only (G2) structure is used in the touch screen panel.

Among these, the GFF is a most commonly used structure and includes two transparent electrodes (indium tin oxide, ITO) formed with two films required to implement X-axes and Y-axes. The G1F includes a first ITO thin film deposited on a rear surface of a glass and uses a film as a second ITO film similarly to a convention method. G2 is a structure formed by a method depositing and patterning an ITO thin film for an X-axis on a rear surface of one reinforced glass, forming an insulation layer thereon, and patterning another ITO thin film for a Y-axis. Transmittance in the GFF, G1F, and G2 is increased while the power consumption is reduced in this order, therefore studies for the G2 structure are actively conducted.

However, in the G2 structure which uses the patterned transparent electrode, a patterned portion and a non-patterned portion (pattern opening) of the transparent electrode may be visually distinct from each other. Accordingly, bigger a difference in reflectance between the patterned portion and the non-patterned portion the reflectance difference clearly appears, therefore, the visibility of the appearance as a display element is decreased. In particular, in a capacitive-type touch panel, since the patterned transparent electrode is formed on the entire surface of the display unit of the display, even if patterning the transparent electrode layer, the display element needs to have a good appearance.

In order to improve such a problem, for example, Japanese Patent Laid-open Publication No. 2008-98169 discloses a transparent conductive film in which an under coat layer including two layers with different refractive indexes is formed between a transparent substrate and a transparent conductive layer. In addition, as an embodiment of thereof, the above-described patent further discloses a transparent conductive file in which a silicon-tin oxide layer having a refractive index of 1.7 as a high refractive index layer (with a thickness of 10 nm or more), a silicon oxide layer having a refractive index of 1.43 as a low refractive index layer (with a thickness of 30 nm), and an ITO film having a refractive index of 1.95 as a transparent conductive layer (with a thickness of 15 nm) are sequentially formed in this order.

However, since a difference between the patterned portion and the non-patterned portion is clearly appeared in the transparent conductive film disclosed in the above-described patent, it is still insufficient to improve the appearance of the display element. Further, when the transparent conductive film further includes a transparent dielectric layer such as a silicon-tin oxide layer or a silicon oxide layer, it is difficult to implement a thin film structure.

SUMMARY OF THE INVENTION

Accordingly, it is an object of the present invention to provide a transparent electrode pattern structure with low visibility due to slight difference in reflectance on separate positions.

In addition, another object of the present invention is to provide a transparent electrode pattern structure with no transparent dielectric layer between the transparent substrate and the transparent electrode layer.

Further, another object of the present invention is to provide a touch panel screen including the transparent electrode pattern structure.

The above objects of the present invention will be achieved by the following characteristics:

(1) A transparent electrode pattern structure including: a first transparent electrode layer and a second transparent electrode layer which are stacked on a transparent substrate in a predetermined pattern, respectively; an insulation layer disposed between the first transparent electrode layer and the second transparent electrode layer; and contact holes formed in the insulation layer to electrically connect the first transparent electrode layer with the second transparent electrode layer; wherein the first transparent electrode layer and the second transparent electrode layer have a thickness of 100 to 200 nm, respectively, and the insulation layer has a thickness of 1,000 to 2,000 nm.

(2) The transparent electrode pattern structure according to the above (1), wherein the first transparent electrode layer and the second transparent electrode layer have a refractive index of 1.8 to 1.98, respectively.

(3) The transparent electrode pattern structure according to the above (1), wherein the insulation layer has a refractive index of 1.4 to 1.6.

(4) The transparent electrode pattern structure according to the above (1), wherein the transparent substrate has a thickness of 0.1 to 0.7 mm.

(5) The transparent electrode pattern structure according to the above (1), wherein the transparent substrate has a refractive index of 1.4 to 1.6.

(6) The transparent electrode pattern structure according to the above (1), further including a passivation layer on a side opposite to a surface on which the transparent substrate in bonded with respect to the transparent electrode pattern structure.

(7) The transparent electrode pattern structure according to the above (6), wherein the passivation layer has a thickness of 2,000 nm or less.

(8) The transparent electrode pattern structure according to the above (6), wherein the passivation layer has a refractive index of 1.4 to 1.6.

(9) The transparent electrode pattern structure according to the above (1), wherein the transparent substrate further includes at least one optical functional layer formed on a surface opposite to a surface on which the transparent electrode is formed.

(10) The transparent electrode pattern structure according to the above (9), wherein the optical functional layer is at least one of an antireflection layer and a pollution preventing layer.

(11) A touch screen panel including the transparent electrode pattern structure according to any one of the above (1) to (10).

According to the transparent electrode pattern structure of the present invention, the thickness of each layer included in the transparent electrode pattern structure is controlled to a predetermined range, thereby obtaining a high transparency by minimizing a difference in reflectance on separate positions occurred due to the patterned transparent electrode structure and reducing the pattern visibility to a user.

According to the above-described aspect, when the transparent electrode pattern structure of the present invention is applied to a touch screen panel with G2 structure, it may represent a high transmittance and low reflectance, thus being usefully used therein.

In addition, the transparent electrode pattern structure of the present invention may represent a low visibility even if it is not provided with a transparent dielectric layer between the transparent substrate and the transparent electrode layer.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

The present invention discloses a transparent electrode pattern structure including: a first transparent electrode layer and a second transparent electrode layer which are stacked on a transparent substrate in a predetermined pattern, respectively; an insulation layer disposed between the first transparent electrode layer and the second transparent electrode layer; and contact holes formed in the insulation layer to electrically connect the first transparent electrode layer with the second transparent electrode layer; wherein the first transparent electrode layer and the second transparent electrode layer have a thickness of 100 to 200 nm, respectively, and the insulation layer has a thickness of 1,000 to 2,000 nm, thereby considerably decreasing a difference in reflectance on separate positions, as well as a touch screen panel including the transparent electrode pattern structure.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
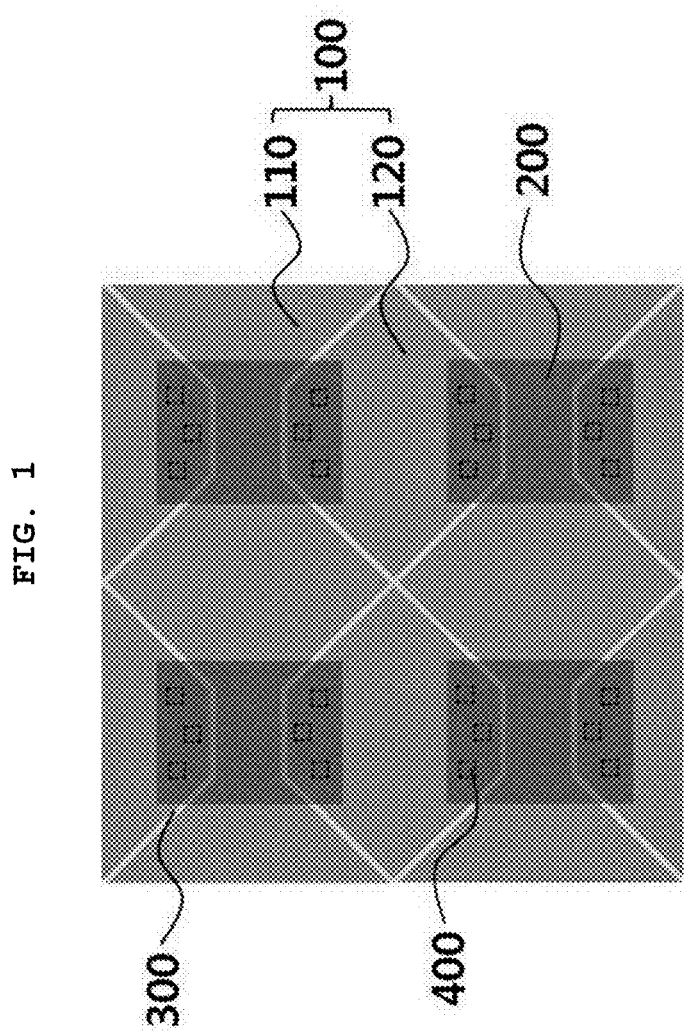
FIG. 1 is a schematic plan view illustrating a transparent electrode pattern structure according to an embodiment of the present invention.

FIG. 1 is a schematic plan view illustrating a transparent electrode pattern structure according to an embodiment of the present invention.

Referring to FIG. 1, the transparent electrode pattern structure of the present invention includes a first transparent electrode layer 100, a second transparent electrode layer 200, an insulation layer 300, and contact holes 400. In addition, the transparent electrode pattern structure of the present invention may be formed on a transparent substrate (not illustrated) and further may include a passivation layer (not illustrated) on a side opposite to a surface of the transparent substrate on which the transparent electrode is formed.

As illustrated in FIG. 1, the transparent electrode pattern structure is formed in a predetermined pattern. The first transparent electrode layer 100 and the second transparent electrode layer 200 provide positional information on a point touched by a user. The insulation layer 300 is disposed between the first transparent electrode layer 100 and the second transparent electrode layer 200 to electrically isolate them from each other, and the contact holes 400 are formed in the insulation layer 300 to electrically connect the first transparent electrode layer 100 with the second transparent electrode layer 200.

Figure 2:
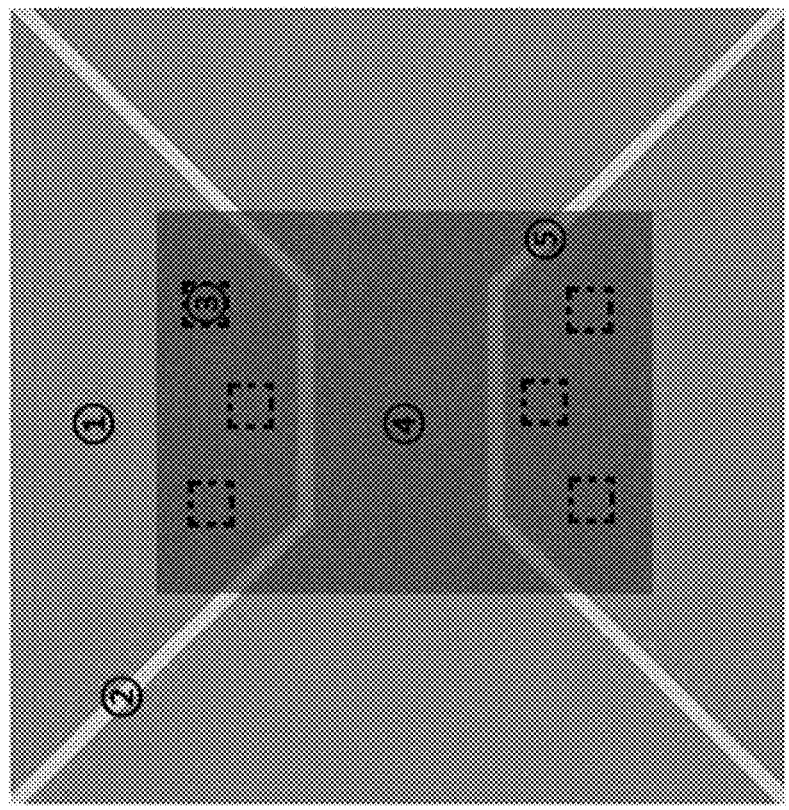
FIG. 2 is a schematic plan view illustrating a unit cell of the transparent electrode pattern structure according to the embodiment of the present invention.
Figure 3:
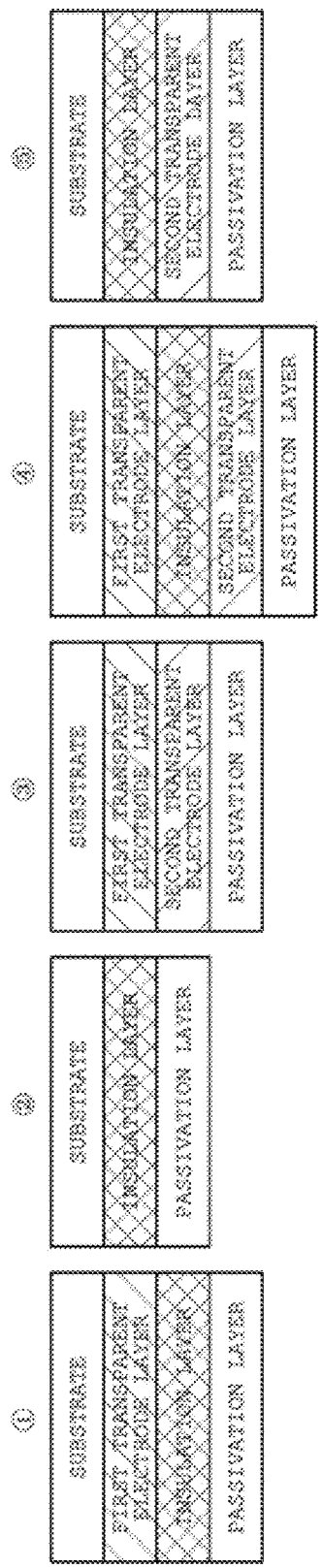
FIG. 3 is a schematic cross-sectional view illustrating stacked structures on separate positions of the transparent electrode pattern structure according to the embodiment of the present invention.

As described above, each component of the transparent electrode pattern structure is formed in the predetermined pattern and, because of this pattern structure, the transparent electrode pattern structure of the present invention may include various stacked structures depending on positions thereof. FIG. 2 is a schematic plan view illustrating a unit cell of the transparent electrode pattern structure according to the embodiment of the present invention. Referring to FIG. 2, the transparent electrode pattern structure may have five type stacked structures depending on separate positions of ① to ⑤, respectively. FIG. 3 schematically illustrates the stacked structures on separate positions of ① to ⑤, respectively.

As illustrated in FIG. 3, since the transparent electrode pattern structure has various layered structures, a difference in reflectance, luminance, chrominance, or the like on separate positions may occur due to these various layered structures depending on positions thereof, and thereby undesirably increasing pattern visibility. Accordingly, there is a limit to the function as a transparent electrode in a conventional transparent electrode pattern structure.

Therefore, in order to solve the above-described problems, the transparent electrode pattern structure of the present invention includes a transparent electrode layer and an insulation layer which have a thickness in a predetermined range, respectively, so as to minimize a difference in reflectance. Hereinafter, the transparent electrode pattern structure according to the embodiment of the present invention will be described in more detail.

(Transparent Electrode)

As illustrated in FIGS. 1 to 3, the transparent electrode pattern structure according to the embodiment of the present invention includes the first transparent electrode layer and the second transparent electrode layer.

The first transparent electrode layer 100 may be formed in a first pattern 110 and a second pattern 120. The first pattern 110 and second pattern 120 are disposed in a same row or column direction so as to provide information on the X and Y coordinates at a position touched by the user. Specifically, when a finger of the user or an object such as a stylus pen contacts on the transparent substrate, capacitance of the touched position is varied and information on the varied capacitance is transferred to a driving circuit (not shown) via the first pattern 110, the second pattern 120, the second transparent electrode layer 200, and position detecting lines. In addition, the difference in capacitance is converted into an electrical signal by X and Y input processing circuits (not shown) to measure the touched position, and X and Y coordinates of the touched position are calculated based on the electrical signal.

In this regard, the first pattern 110 and second pattern 120 have to be formed in the same layer (the first transparent electrode layer), and the respective patterns have to be electrically connected to each other to detect the touched position. However, since the first patterns 110 are connected to each other while the second patterns 120 are separated from each other in an island form, additional connection lines are needed to electrically connect the second patterns 120 each other.

However, the connection lines should not be electrically connected to the first patterns 110, thus, have to be formed in a layer different from the first transparent electrode layer 100. Accordingly, the second transparent electrode layer 200 is formed in an alternative layer different from the first transparent electrode layer 100 to electrically connect the second patterns 120 each other. That is, the second transparent electrode layer 200 has a function of electrically connecting the second patterns 120 of the first transparent electrode layer 100.

Therefore, in FIGS. 2 and 3, the positions of ①, ③ and ④ represent portions in which the first transparent electrode layer 100 is formed in a predetermined pattern to detect the touched region, respectively, and the positions of ③, ④ and ⑤ represent portions in which the second transparent electrode layer 200 is arranged so as to electrically connect the second patterns 120, respectively.

Herein, the second transparent electrode layer 200 has to be electrically isolated from the first pattern 110 of the first transparent electrode layer 100. Therefore, the transparent electrode pattern structure of the present invention includes the insulation layer 300 and the contact holes 400 (③ in FIG. 2), which will be described below.

In the present invention, the first and the second transparent electrode layers 100 and 200 have a thickness of 100 to 200 nm, respectively. If the thickness of these layers is not within the above-described range, a difference in reflectance on separate positions may be increased, hence causing increase in pattern reflection visibility. Specifically, if the thickness thereof is less than 100 nm, the touch sensitivity may be lowered by increasing an electrical resistance, while, if the thickness thereof exceeds 200 nm, the visibility may be deteriorated by increasing the reflectance.

In addition, the transparent electrode layers according to the present invention are possible to achieve low visibility even in a case of having a structure in which a transparent substrate directly contacts with a transparent electrode layer formed thereon, without interposing a transparent dielectric layer made of metallic oxide (for example, silicon oxide, niobium oxide or the like) between the transparent substrate and the transparent electrode layer, which is provided to ensure optical uniformity, similarly to a conventional technique to apply such a transparent dielectric layer as described above.

Further, it is preferable that the first and the second transparent electrode layers 100 and 200 have a refractive index of 1.8 to 1.98, respectively. When these layers have a refractive index within the above-described range, reduction in reflectance may be more improved.

Any conventional conductive material known in the related art may be used for the first and the second transparent electrode layers 100 and 200, without particular limitation thereof. For example, the conductive material for forming the transparent electrode may include indium-tin oxide (ITO), indium-zinc oxide (IZO), zinc oxide (ZnO), indium-zinc-tin oxide (IZTO), cadmium-tin oxide (CTO), poly(3,4-ethylenedioxythiopene) (PEDOT), carbon nanotube (CNT), metal wire, etc., which are used alone or in combination of two or more thereof. Preferably, the indium-tin oxide (ITO) is used. Metals used in the metal wire are not particularly limited but may include, for example, silver (Ag), gold, aluminum, copper, iron, nickel, titanium, tellurium, chromium, etc., which are used alone or in combination of two or more thereof.

The first and the second transparent electrode layers 100 and 200 may be formed by various thin film deposition techniques such as a physical vapor deposition (PVD) method, a chemical vapor deposition (CVD) method or the like. The first and the second transparent electrode layers 100 and 200 may be formed by reactive sputtering which is an example of the PVD method.

In addition, the first and the second transparent electrode layers 100 and 200 may be formed by a printing process. To print transparent electrodes, various printing methods such as gravure off-set printing, reverse off-set printing, screen printing, gravure printing, etc., may be used during the printing process. In particular, when the first and the second transparent electrode layers 100 and 200 are formed by the printing process, the transparent electrodes may be made of a printable paste material. For example, transparent electrodes may be made of a carbon nano tube (CNT), a conductive polymer, and Ag nano wire ink.

In the present invention, the laminating sequence of the first transparent electrode layer 100 and the second transparent electrode layer 200 is not particularly limited. Therefore, in another embodiment of the present invention, the lamination sequence of the first transparent electrode layer 100 and the second transparent electrode layer 200 shown in FIG. 3 may be changed. For example, the second transparent electrode layer is firstly formed on the transparent substrate instead of the first transparent electrode layer, the insulation layer is formed thereon, and then the first transparent electrode layer is formed on the insulation layer.

(Insulation Layer and Contact Hole)

The insulation layer 300 is formed between the first transparent electrode layer 100 and the second transparent electrode layer 200 to isolate the first transparent electrode layer 100 from the second transparent electrode layer 200, so as to prevent electrical connection therebetween. However, as illustrated in FIGS. 2 and 3, when the second transparent electrode layer 200 electrically connects the adjacent second patterns 120 of the first transparent electrode layer 100, the second transparent electrode layer 200 should be electrically connected with the first transparent electrode layer 100, therefore, a portion on which the insulation layer 300 is not formed is required. As such, the portion on which the insulation layer 300 is not formed in the insulation layer area is referred to as the contact hole 400 (③ in FIG. 2). Accordingly, the second transparent electrode layer 200 is electrically connected with (the second pattern 120 of) the first transparent electrode layer 100 in the contact hole 400.

In the present invention, the insulation layer 300 may have a thickness of 1,000 to 2,000 nm. If the thickness of the insulation layer 300 is not within the above-described range, a difference in reflectance on separate positions may be increased, hence increasing the pattern reflection visibility. If the thickness thereof is less than 1,000 nm, the touch sensitivity may be lowered by increasing a capacitance occurred between the transparent electrodes, while, if the thickness thereof exceeds 2,000 nm, an effect resulting from the increasing of thickness may not be further obtained.

Preferably, the insulation layer 300 has a refractive index of 1.4 to 1.6. When the insulation layer 300 has a refractive index within the above-described range, reduction in reflectance may be more improved.

Any conventional insulation material known in the related art may be used for the insulation layer 300 without particular limitation thereof. For example, the insulation layer 300 may be formed in a desired pattern using metallic oxide such as silicon oxide, a transparent photosensitive resin composition including acryl resin, or a thermosetting resin composition.

The insulation layer 300 may be formed on the first transparent electrode layer 100 using a deposition or printing method, for example.

In the present invention, the contact holes 400 may be formed in such a way that an insulation layer is entirely formed on the first transparent electrode layer 100, and then a plurality of holes are formed therein (hole method), or a way that an insulation layer is formed on the first transparent electrode layer 100 except portions where the first transparent electrode layer 100 is electrically connected with the second transparent electrode layer 200 (island method).

(Transparent Substrate)

The transparent substrate is a part that forms an outermost surface of the touch screen panel and directly contacts with the finger of the user or the object. The transparent electrode pattern structure of the present invention is formed on a side opposite to a surface directly contacting with the finger of the user or the object. As illustrated in FIG. 3, the transparent electrode pattern structure of the present invention is sequentially formed on the transparent substrate from the first transparent electrode layer.

The transparent substrate may be prepared of any material, if it has high durability to sufficiently protect the touch screen panel from external forces and allow a user to view the display very well, and any material for forming the transparent substrate used in the related art may be adopted without particular limitation thereto. For example, glass, polyethersulfone (PES), polyacrylate (PAR), polyetherimide (PEI), polyethylene napthalate (PEN), polyethylene terepthalate (PET), polyphenylene sulfide (PPS), polyallylate, polyimide, polycarbonate (PC), cellulose triacetate (TAC), cellulose acetate propionate (CAP), etc., may be used. Preferably, the glass is used and, and more preferably, a reinforced glass is used.

The transparent substrate according to the present invention may have a proper thickness, for example, ranging from 0.1 to 0.7 mm. When the transparent substrate has a thickness within the above-described range, reduction in reflectance may be more improved.

Preferably, the transparent substrate has a refractive index of 1.4 to 1.6. When the transparent substrate has a refractive index within the above-described range, reduction in reflectance may be more improved.

In the present invention, the transparent substrate may further include at least one optical functional layer on a side opposite to a surface on which the transparent electrode is formed. The optical functional layer may be an antireflection layer, a pollution preventing layer such as an anti-fingerprinting layer, or the like, which may be used alone or in combination of two or more thereof.

(Passivation Layer)

In order to prevent the first and the second transparent electrode layers 100 and 200 from being contaminated by external environmental factors (moisture, air, etc.), the transparent electrode pattern structure of the present invention may include a passivation layer on a side opposite to a surface on which the transparent substrate in bonded with respect to the transparent electrode pattern structure, if necessary.

The passivation layer may be prepared by adopting any material useable for the insulation layer 300.

The passivation layer according to the present invention may have a proper thickness, for example, 2,000 nm or less, and specifically, ranging from 0 to 2,000 nm. When the passivation layer has a thickness within the above-described range, reduction in reflectance may be more improved.

Preferably, the passivation layer has a refractive index of 1.4 to 1.6. When the passivation layer has a refractive index within the above-described range, reduction in reflectance may be more improved.

(Adhesive Layer)

The transparent electrode pattern structure of the present invention may be bonded to a display panel part using a adhesive layer. The adhesive layer is prepared by applying a transparent curable resin composition and curing the same (OCR), or pressing a adhesive layer previously formed in a film shape onto the transparent electrode pattern structure (OCA).

The adhesive layer also may affect the reflectance of the transparent electrode pattern structure. Therefore, in order to reduce the reflectance of the transparent electrode pattern structure, it is preferable that the adhesive layer has a proper thickness and refractive index. For example, the adhesive layer may have a thickness of 0 to 250 μm and a refractive index of 1 to 1.6. When the adhesive layer has a thickness of 0 μm, the transparent electrode pattern structure has no adhesive layer and only an air gap is formed between the transparent electrode pattern structure and the touch screen panel, because, the adhesive layer is not formed on a portion of the transparent electrode pattern structure to be actually displayed an image other than an edge portion on which the adhesive layer is formed.

As described above, since the transparent electrode layer and the insulation layer included in the transparent electrode pattern structure of the present invention have a thickness in a predetermined range, it is possible to minimize a difference in reflectance on separate positions and significantly improve a transparency of the transparent electrode pattern structure. Therefore, the transparent electrode pattern structure of the present invention may be used in manufacturing a touch screen panel having an excellent transparency by binding the above transparent electrode pattern structure to the display panel part.

Hereinafter, preferred embodiments will be described to more concretely understand the present invention with reference to examples. However, it will be apparent to those skilled in the art that such embodiments are provided for illustrative purposes and various modifications and alterations may be possible without departing from the scope and spirit of the present invention, and such modifications and alterations are duly included in the present invention as defined by the appended claims.

EXAMPLE

Examples 1 to 3 and Comparative Examples 1 to 6

Transparent electrode pattern structures having a thickness shown in Table 1 below were fabricated in Examples 1 to 3 and Comparative Examples 1 to 6, respectively. Then, for each of the structures, average reflectances on separate positions were measured thereon, respectively, and a difference between the maximum value and the minimum value of the average reflectances was calculated and shown in Table 1 below.

Herein, the average reflectance means the average of the reflectances in a range of 400 nm to 700 nm.

A glass (refractive index: 1.51, extinction coefficient: 0) as a transparent substrate, an ITO film (refractive index: 1.8, extinction coefficient: 0) as a first transparent electrode layer, an ITO film (refractive index: 1.8, extinction coefficient: 0) as a second transparent electrode layer, and an NCS-801 (Sumitomo Co.) (refractive index: 1.51, extinction coefficient: 0) which is an acrylic insulating material, as an insulation layer and passivation layer, were respectively used, and the refractive index and the extinction coefficient were determined, with reference to a light having a wavelength of 550 nm.

Air stated in the adhesive layer item of Table 1 means that the adhesive layer is not formed on a portion to be displayed an image and the adhesive layer is formed only on a bezel (edge) portion.

Meanwhile, as a Reference Example 1, a transparent electrode pattern structure was fabricated and used by the same procedures for fabrication of the transparent electrode pattern structure in Example 3 except that a transparent dielectric layer having 8 nm of $Nb_2O_5$ and 50 nm of $SiO_2$ is further provided between the transparent substrate and the first transparent electrode layer.

TABLE 1

| | Transparent substrate | First transparent electrode layer | Insulation layer | Second transparent electrode layer | Passivation layer | Adhesive layer | Average reflectance (%) | Maximum difference in reflectance (%) |
|---|---|---|---|---|---|---|---|---|
| Example 1 | 0.7 mm | 122.5 nm | 1,500 nm | 120 nm | 1,500 nm | Air | ①: 8.7<br>②: 8.1<br>③: 9.8<br>④: 9.2<br>⑤: 8.8 | 1.7 |
| Example 2 | 0.7 mm | 122.5 nm | 1,750 nm | 120 nm | 1,000 nm | Air | ①: 8.9<br>②: 7.5<br>③: 9.2<br>④: 9.9<br>⑤: 8.7 | 2.4 |
| Example 3 | 0.7 mm | 150 nm | 1,500 nm | 150 nm | 1,500 nm | Air | ①: 9.3<br>②: 8.1<br>③: 9.6<br>④: 10.4<br>⑤: 9.8 | 2.2 |
| Comparative Example 1 | 0.7 mm | 10 nm | 1,500 nm | 50 nm | 1,500 nm | Air | ①: 8.3<br>②: 8.1<br>③: 10.5<br>④: 10.3<br>⑤: 10.3 | 2.4 |
| Comparative Example 2 | 0.7 mm | 250 nm | 1,500 nm | 50 nm | 1,500 nm | Air | ①: 9.4<br>②: 8.1<br>③: 9.6<br>④: 12.3<br>⑤: 10.3 | 4.2 |
| Comparative Example 3 | 0.7 mm | 50 nm | 500 nm | 50 nm | 1,500 nm | Air | ①: 10.8<br>②: 8.0<br>③: 9.9<br>④: 13.1<br>⑤: 10.5 | 5.1 |
| Comparative Example 4 | 0.7 mm | 50 nm | 2,500 nm | 50 nm | 1,500 nm | Air | ①: 10.5<br>②: 8.6<br>③: 9.9<br>④: 12.6<br>⑤: 9.7 | 4.0 |
| Comparative Example 5 | 0.7 mm | 50 nm | 1,500 nm | 10 nm | 1,500 nm | Air | ①: 10.7<br>②: 8.1<br>③: 10.5<br>④: 10.7<br>⑤: 8.3 | 2.6 |
| Comparative Example 6 | 0.7 mm | 50 nm | 1,500 nm | 250 nm | 1,500 nm | Air | ①: 10.7<br>②: 8.1<br>③: 9.6<br>④: 12.5<br>⑤: 9.2 | 4.3 |

TABLE 1-continued

| | Transparent substrate | First transparent electrode layer | Insulation layer | Second transparent electrode layer | Passivation layer | Adhesive layer | Average reflectance (%) | Maximum difference in reflectance (%) |
|---|---|---|---|---|---|---|---|---|
| Reference Example 1 | 0.7 mm | 150 nm | 1500 nm | 150 nm | 1,500 nm | Air | ①: 8.87<br>②: 9.13<br>③: 9.77<br>④: 9.59<br>⑤: 10.11 | 1.24 |

Examples 4 to 6 and Comparative Examples 7 to 10

Transparent electrode pattern structures having a thickness shown in Table 2 below were fabricated, respectively. Then, for each of the structures, average reflectances on separate positions were measured thereon, and a difference between the maximum value and the minimum value of the average reflectances was calculated and shown in Table 2 below.

Herein, the average reflectance means the average of the reflectances in a range of 400 nm to 700 nm.

A glass (refractive index: 1.51, extinction coefficient: 0) as a transparent substrate, an ITO film (refractive index: 1.8, extinction coefficient: 0.014) as a first transparent electrode layer, an ITO film (refractive index: 1.8, extinction coefficient: 0.014) as a second transparent electrode layer, and an NCS-801 (Sumitomo Co.) (refractive index: 1.51, extinction coefficient: 0) which is an acrylic insulating material, as an insulation layer and passivation layer, were respectively used, and the refractive index and the extinction coefficient were determined, with reference to a light having a wavelength of 550 nm.

Air stated in the adhesive layer item of Table 2 means that the adhesive layer is not formed on a portion to be displayed an image and the adhesive layer is formed only on a bezel (edge) portion.

Meanwhile, as a Reference Example 2, a transparent electrode pattern structure was fabricated and used by the same procedures for fabrication of the transparent electrode pattern structure in Example 6 except that a transparent dielectric layer having 8 nm of $Nb_2O_5$ and 50 nm of $SiO_2$ is further provided between the transparent substrate and the first transparent electrode layer.

TABLE 2

| | Transparent substrate | First transparent electrode layer | Insulation layer | Second transparent electrode layer | Passivation layer | Adhesive layer | Average reflectance (%) | Maximum difference in reflectance (%) |
|---|---|---|---|---|---|---|---|---|
| Example 4 | 0.7 mm | 122.5 nm | 1,500 nm | 120 nm | 1,500 nm | Air | ①: 8.3<br>②: 8.1<br>③: 8.9<br>④: 8.4<br>⑤: 8.5 | 0.8 |
| Example 5 | 0.7 mm | 122.5 nm | 1,750 nm | 120 nm | 1,000 nm | Air | ①: 8.5<br>②: 7.5<br>③: 8.5<br>④: 9.0<br>⑤: 8.3 | 1.5 |
| Example 6 | 0.7 mm | 150 nm | 1,500 nm | 100 nm | 1,500 nm | Air | ①: 8.8<br>②: 8.1<br>③: 9.0<br>④: 9.0<br>⑤: 8.8 | 0.9 |
| Comparative Example 7 | 0.7 mm | 10 nm | 1,500 nm | 50 nm | 1,500 nm | Air | ①: 8.3<br>②: 8.1<br>③: 10.3<br>④: 10.1<br>⑤: 10.1 | 2.1 |
| Comparative Example 8 | 0.7 mm | 50 nm | 500 nm | 50 nm | 1,500 nm | Air | ①: 10.6<br>②: 8.0<br>③: 9.5<br>④: 12.6<br>⑤: 10.6 | 4.6 |
| Comparative Example 9 | 0.7 mm | 50 nm | 2,500 nm | 50 nm | 1,500 nm | Air | ①: 10.3<br>②: 8.6<br>③: 9.5<br>④: 12.1<br>⑤: 9.5 | 3.5 |
| Comparative Example 10 | 0.7 mm | 50 nm | 1,500 nm | 10 nm | 1,500 nm | Air | ①: 10.5<br>②: 8.1<br>③: 10.3<br>④: 10.5<br>⑤: 8.3 | 2.4 |

TABLE 2-continued

| | Transparent substrate | First transparent electrode layer | Insulation layer | Second transparent electrode layer | Passivation layer | Adhesive layer | Average reflectance (%) | Maximum difference in reflectance (%) |
|---|---|---|---|---|---|---|---|---|
| Reference Example 2 | 0.7 mm | 150 nm | 1500 nm | 100 nm | 1,500 nm | Air | ①: 8.45<br>②: 9.13<br>③: 8.5<br>④: 9.74<br>⑤: 10.75 | 2.30 |

Examples 7 and 8 and Comparative Examples 11 to 16

Transparent electrode pattern structures having a thickness shown in Table 3 below were fabricated, respectively. Then, for each of the structures, average reflectances on separate positions were measured thereon, and a difference between the maximum value and the minimum value of the average reflectances was calculated and shown in Table 3 below.

Herein, the average reflectance means the average of the reflectances in a range of 400 nm to 700 nm.

A glass (refractive index: 1.51, extinction coefficient: 0) as a transparent substrate, an ITO film (refractive index: 1.8, extinction coefficient: 0) as a first transparent electrode layer, an ITO film (refractive index: 1.8, extinction coefficient: 0.014) as a second transparent electrode layer, and an NCS-801 (Sumitomo Co.) (refractive index: 1.51, extinction coefficient: 0) which is an acrylic insulating material, as an insulation layer and passivation layer, were respectively used, and the refractive index and the extinction coefficient were determined, with reference to a light having a wavelength of 550 nm.

Air stated in the adhesive layer item of Table 3 means that the adhesive layer is not formed on a portion to be displayed an image and the adhesive layer is formed only on a bezel (edge) portion.

Meanwhile, as a Reference Example 3, a transparent electrode pattern structure was fabricated and used by the same procedures for fabrication of the transparent electrode pattern structure in Example 7 except that a transparent dielectric layer having 8 nm of $Nb_2O_5$ and 50 nm of $SiO_2$ is further provided between the transparent substrate and the first transparent electrode layer.

TABLE 3

| | Transparent substrate | First transparent electrode layer | Insulation layer | Second transparent electrode layer | Passivation layer | Adhesive layer | Average reflectance (%) | Maximum difference in reflectance (%) |
|---|---|---|---|---|---|---|---|---|
| Example 7 | 0.7 mm | 122.5 nm | 1,500 nm | 120 nm | 1,500 nm | Air | ①: 9.8<br>②: 8.1<br>③: 11.5<br>④: 10.9<br>⑤: 9.8 | 3.3 |
| Example 8 | 0.7 mm | 122.5 nm | 1,750 nm | 120 nm | 1,000 nm | Air | ①: 9.9<br>②: 7.5<br>③: 10.5<br>④: 10.9<br>⑤: 9.2 | 3.5 |
| Comparative Example 11 | 0.7 mm | 10 nm | 1,500 nm | 50 nm | 1,500 nm | Air | ①: 8.6<br>②: 8.1<br>③: 13.3<br>④: 13.1<br>⑤: 12.7 | 5.2 |
| Comparative Example 12 | 0.7 mm | 250 nm | 1,500 nm | 50 nm | 1,500 nm | Air | ①: 12.0<br>②: 8.1<br>③: 10.8<br>④: 16.8<br>⑤: 12.7 | 8.6 |
| Comparative Example 13 | 0.7 mm | 50 nm | 500 nm | 50 nm | 1,500 nm | Air | ①: 14.0<br>②: 8.0<br>③: 11.0<br>④: 18.2<br>⑤: 13.3 | 10.2 |
| Comparative Example 14 | 0.7 mm | 50 nm | 2,500 nm | 50 nm | 1,500 nm | Air | ①: 13.5<br>②: 8.6<br>③: 11.0<br>④: 18.0<br>⑤: 11.9 | 9.4 |
| Comparative Example 15 | 0.7 mm | 50 nm | 1,500 nm | 10 nm | 1,500 nm | Air | ①: 13.8<br>②: 8.1<br>③: 13.5<br>④: 14.0<br>⑤: 8.5 | 5.9 |

TABLE 3-continued

|  | Transparent substrate | First transparent electrode layer | Insulation layer | Second transparent electrode layer | Passivation layer | Adhesive layer | Average reflectance (%) | Maximum difference in reflectance (%) |
|---|---|---|---|---|---|---|---|---|
| Comparative Example 16 | 0.7 mm | 50 nm | 1,500 nm | 250 nm | 1,500 nm | Air | ①: 13.8<br>②: 8.1<br>③: 10.1<br>④: 16.7<br>⑤: 10.6 | 8.5 |
| Reference Example 3 | 0.7 mm | 122.5 nm | 1500 nm | 120 nm | 1,500 nm | Air | ①: 9.91<br>②: 9.13<br>③: 10.90<br>④: 9.74<br>⑤: 11.62 | 2.49 |

Referring to Tables 1 to 3, since the average reflectance is less than 13% in all of Examples, the average reflectance itself is not high. Further, since the difference between the maximum value and the minimum value of the average reflectances is less than 4%, a deviation in reflectance on separate positions is small, thereby demonstrating low visibility. In particular, it can be seen that the average reflectance in each of Examples, which do not include the transparent dielectric layer, is similar to that of the Reference Examples, even compared with the Reference Examples which include the transparent dielectric layer.

On the other hand, there is a case in which the average reflectance exceeds 13% among Comparative Examples, and specifically, when the difference between the maximum value and the minimum values of the average reflectances exceeds 4%, the deviation in reflectance on separate positions is large and the visibility is very high. Consequently, it was found that the transparent electrode pattern structure prepared in Comparative Examples is unsuitable for use as a transparent electrode.

In addition, Comparative Example 1, 4, 5, 7, 9 and 10 among the Comparative Examples shown the average reflectance of 4% or less, but the first and the second transparent electrode layers of these Comparative Examples have a thickness of 50 nm or less, respectively. If the thickness of each transparent electrode layer is 50 nm or less, electrical conductivity is lowered, and thereby it does not satisfy the basic function as an electrode.

In this regard, after ITO films are deposited on a glass substrate of a length of 50 mm, a width of 50 mm and a thickness of 0.7 mm (50×50×0.7 mm) in different thicknesses at 120° C., electrical resistance was measured in one center point thereof, and the measured results are shown in Table 4 below.

TABLE 4

|  | ITO film thickness (nm) | | | |
|---|---|---|---|---|
|  | 150 | 100 | 55 | 35 |
| Rs (Ω/□) | 17.9 | 27.0 | 82.6 | 127.8 |

Referring to Table 4, it can be seen that the transparent electrode layer does not have excellent electrical conductivities, until the electrode has a thickness of at least 100 nm.

What is claimed is:

1. A transparent electrode pattern structure comprising:
   a transparent substrate;
   a first transparent electrode layer and a second transparent electrode layer which are stacked on the transparent substrate in a predetermined pattern, respectively, the first transparent electrode layer being configured to detect a touched position of the transparent substrate;
   an insulation layer disposed between the first transparent electrode layer and the second transparent electrode layer; and
   contact holes formed in the insulation layer to electrically connect the first transparent electrode layer with the second transparent electrode layer;
   wherein the first transparent electrode layer includes first patterns and second patterns formed in the same layer, the first patterns are connected to each other, and the second patterns are separated from each other in an island form,
   wherein the first transparent electrode layer and the second transparent electrode layer have a thickness of 100 to 200 nm, respectively, and the insulation layer has a thickness of 1,000 to 2,000 nm.

2. The transparent electrode pattern structure according to claim 1, wherein the first transparent electrode layer and the second transparent electrode layer have a refractive index of 1.8 to 1.98, respectively.

3. The transparent electrode pattern structure according to claim 1, wherein the insulation layer has a refractive index of 1.4 to 1.6.

4. The transparent electrode pattern structure according to claim 1, wherein the transparent substrate has a thickness of 0.1 to 0.7 mm.

5. The transparent electrode pattern structure according to claim 1, wherein the transparent substrate has a refractive index of 1.4 to 1.6.

6. The transparent electrode pattern structure according to claim 1, further comprising a passivation layer on a side opposite to a surface on which the transparent substrate in bonded with respect to the transparent electrode pattern structure.

7. The transparent electrode pattern structure according to claim 6, wherein the passivation layer has a thickness of 2,000 nm or less.

8. The transparent electrode pattern structure according to claim 6, wherein the passivation layer has a refractive index of 1.4 to 1.6.

9. The transparent electrode pattern structure according to claim 1, wherein the transparent substrate further comprises at least one optical functional layer formed on a surface opposite to a surface on which the transparent electrode is formed.

10. The transparent electrode pattern structure according to claim 9, wherein the optical functional layer is at least one of an antireflection layer and a pollution preventing layer.

11. A touch screen panel comprising the transparent electrode pattern structure according to claim 1.

12. The transparent electrode pattern structure according to claim 1, wherein neighboring second patterns of the second patterns are electrically connected by the second transparent electrode layer via the contact hole.

* * * * *